US012222503B2

(12) United States Patent
Mills et al.

(10) Patent No.: US 12,222,503 B2
(45) Date of Patent: Feb. 11, 2025

(54) OPTICAL ARRANGEMENT FOR A DISPLAY

(71) Applicant: Snap Inc., Santa Monica, CA (US)

(72) Inventors: Rory Thomas Alexander Mills, Rochester (GB); Ian Thomas Macken, Rochester (GB)

(73) Assignee: SNAP INC., Santa Monica, CA (US)

( * ) Notice: Subject to any disclaimer, the term of this patent is extended or adjusted under 35 U.S.C. 154(b) by 534 days.

(21) Appl. No.: 17/594,426

(22) PCT Filed: Mar. 17, 2020

(86) PCT No.: PCT/GB2020/050678
§ 371 (c)(1),
(2) Date: Oct. 15, 2021

(87) PCT Pub. No.: WO2020/212682
PCT Pub. Date: Oct. 22, 2020

(65) Prior Publication Data
US 2022/0187605 A1    Jun. 16, 2022

(30) Foreign Application Priority Data

Apr. 18, 2019  (EP) ..................... 19275056
Apr. 18, 2019  (GB) ..................... 1905529

(51) Int. Cl.
*G02B 27/01* (2006.01)
*G02B 17/08* (2006.01)
*G02B 27/09* (2006.01)

(52) U.S. Cl.
CPC ....... *G02B 27/0172* (2013.01); *G02B 17/086* (2013.01); *G02B 27/0944* (2013.01); *G02B 2027/013* (2013.01); *G02B 2027/0178* (2013.01)

(58) Field of Classification Search
CPC ... G02B 5/04; G02B 5/28; G02B 5/32; G02B 17/04; G02B 17/06; G02B 17/086;
(Continued)

(56) References Cited

U.S. PATENT DOCUMENTS 4,969,724 A   11/1990  Ellis
5,093,567 A    3/1992  Staveley
(Continued)

FOREIGN PATENT DOCUMENTS

AU    2020259217    11/2021
CA       3136784    10/2020
(Continued)

OTHER PUBLICATIONS

International Preliminary Report on Patentability received for PCT Application No. PCT/GB2020/050678. Date of Issue: Sep. 28, 2021. 9 pages.
(Continued)

*Primary Examiner* — Sultan Chowdhury
(74) *Attorney, Agent, or Firm* — SCHWEGMAN LUNDBERG & WOESSNER, P.A.

(57) ABSTRACT

A folded optical arrangement to transmit an image from an image plane to a user's eye through a folded optical transmission path including a collimating element having a first optical element with optically powered surfaces and a second optical element with at least one optically powered surface to receive light from an image source and to collimate and output the light. The first optically powered surfaces and the second optically powered surface to define multiple interfaces along the folded optical path. A refractive index change at each interface controls a direction of light passing through each interface. One surface of the first optical element and the second optical element are adjacent to one another. The adjacent surfaces have dissimilar shapes
(Continued)

and each defines an angle with a respective other surface of the relevant optical element at opposing ends of the adjacent surfaces. The opposing angles are not equal.

20 Claims, 14 Drawing Sheets

(58) Field of Classification Search
 CPC ............ G02B 17/0894; G02B 17/0896; G02B 27/01; G02B 27/0101; G02B 27/0107; G02B 27/017; G02B 27/0172; G02B 27/0176; G02B 27/0081; G02B 27/0944; G02B 2027/0105; G02B 2027/0107; G02B 2027/0109; G02B 2027/013; G02B 2027/0178
 See application file for complete search history.

(56) References Cited

U.S. PATENT DOCUMENTS

| | | | | |
|---|---|---|---|---|
| 5,535,025 | A * | 7/1996 | Hegg | G02B 27/0172 349/5 |
| 8,749,890 | B1 * | 6/2014 | Wood | G02B 6/34 359/632 |
| 9,523,852 | B1 * | 12/2016 | Brown | G02B 27/4211 |
| 2006/0228073 | A1 | 10/2006 | Mukawa et al. | |
| 2014/0293434 | A1 | 10/2014 | Cheng et al. | |
| 2015/0253576 | A1 * | 9/2015 | Sugihara | G02B 5/04 359/633 |
| 2016/0103306 | A1 | 4/2016 | Takahashi | |
| 2016/0349518 | A1 | 12/2016 | Amitai et al. | |
| 2018/0143427 | A1 * | 5/2018 | Griffin | G02B 17/086 |

FOREIGN PATENT DOCUMENTS

| | | |
|---|---|---|
| EP | 3726272 | 10/2020 |
| EP | 3942349 | 1/2022 |
| KR | 101128635 B1 | 3/2012 |
| KR | 20210152054 | 12/2021 |
| WO | 02/099507 A1 | 12/2002 |
| WO | 2020212682 A1 | 10/2020 |

OTHER PUBLICATIONS

International Search Report and Written Opinion received for PCT Application No. PCT/GB2020/050678. Mail date: Apr. 29, 2020. 14 pages.
GB Search Report under Section 17(5) received for GB Application No. 1905529.2, dated Sep. 25, 2019. 3 pages.
Extended European Search Report received for EP Application No. 19275056.0, dated Oct. 30, 2019. 10 pages.
"European Application Serial No. 20713356.2, Communication Pursuant to Article 94(3) EPC mailed Jun. 7, 2024", 5 pgs.
"European Application Serial No. 20713356.2, Response to Communication pursuant to Rules 161(1) and 162 EPC filed May 6, 2022", 8 pgs.
"Australian Application Serial No. 2020259217, First Examination Report mailed Aug. 7, 2024", 3 pgs.
"Australian Application Serial No. 2020259217, Response filed Nov. 12, 2024 to First Examination Report mailed Aug. 7, 2024", 11 pgs.
"Canadian Application Serial No. 3136784, Voluntary Amendment Filed Oct. 31, 2024", 6 pgs.
"European Application Serial No. 20713356.2, Response filed Oct. 4, 2024 to Communication Pursuant to Article 94(3) EPC mailed Jun. 7, 2024", 11 pgs.
"Korean Application Serial No. 10-2021-7036298, Notice of Preliminary Rejection mailed Sep. 11, 2024", w/ English Translation, 17 pgs.

* cited by examiner

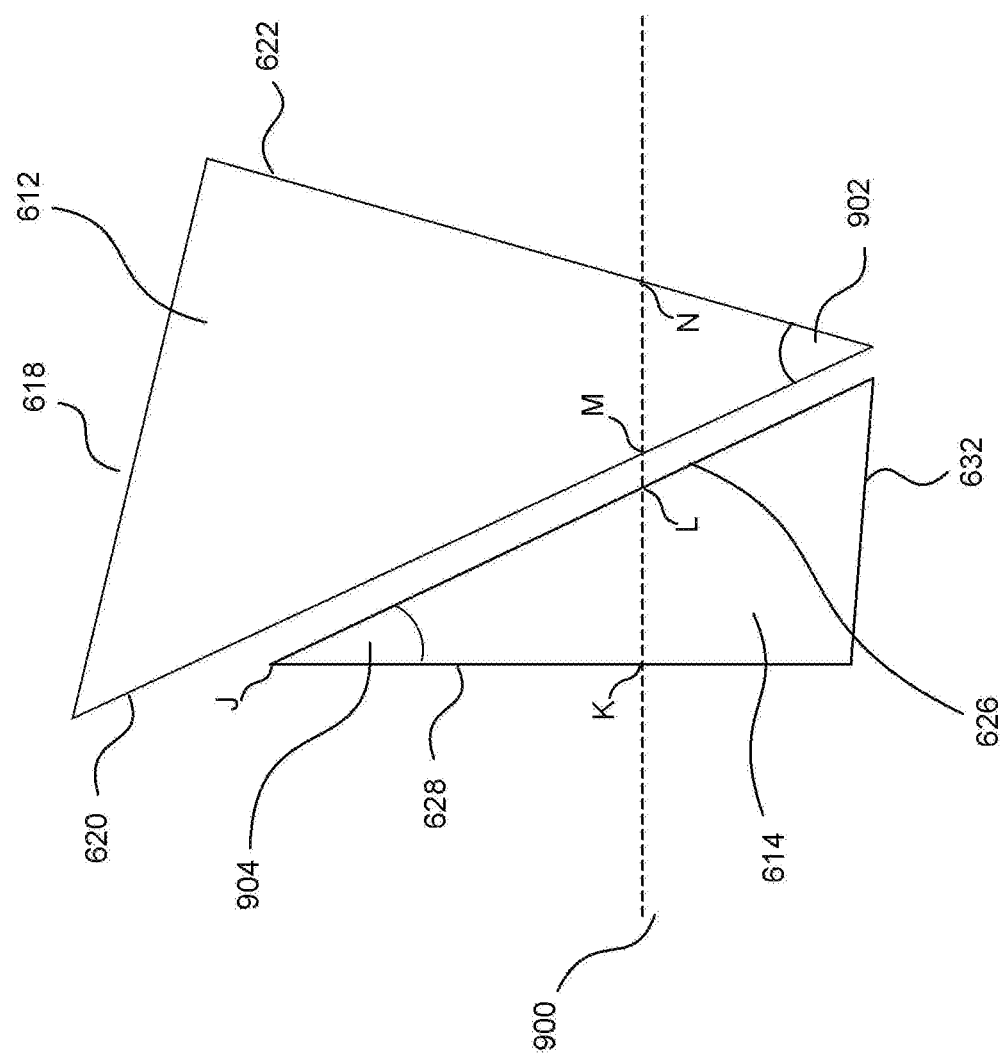

3D SIDE ON
OPTICAL POWER ON SURFACES
LINE ART ONLY

OPTICAL ARRANGEMENT FOR A DISPLAY

CLAIM OF PRIORITY

This application is a U.S. national-phase application filed under 35 U.S.C. § 371 from International Application Serial No. PCT/GB2020/050678, filed on Mar. 17, 2020, and published as WO 2020/212682 on Oct. 22, 2020, which claims the benefit of priority to United Kingdom Patent Application Serial No. 1905529.2, filed on Apr. 18, 2019, and European Patent Application Serial No. 19275056.0, filed on Apr. 18, 2019, each of which is incorporated herein by reference in its entirety.

BACKGROUND

The present invention relates to improvements in or relating to optics for use in displays, such as head-mounted displays; head-worn displays; and/or Heads Up Displays.

Some displays, such as head-mounted displays (HMDs); head-worn displays (HWDs) or Heads Up Displays (HUD) are targeted to be as small and lightweight as possible. An example HMD 100 is illustrated in FIG. 1.

HMDs, such as HMD 100, are wearable by a user by means of an appropriate support 102. The support includes one or more optical elements 104 which can be viewed by one or both eyes of the user. Although not shown in detail, the optical elements 104 include a substantially transparent display medium. The user is able to view the exterior environment through the optical elements 104. The user is also able to view images relayed to the eye of the user in use via the HMD.

In conventional systems, images are relayed to the eye of the user in use using lens trains or folded optical designs. Lens trains or folded optical designs are incorporated into the HMD 100. Traditionally, lens trains or folded optical designs are incorporated within the support 102 of the HMD 100.

Traditional optical lens trains are linear and non-folded for simplicity. Multiple elements are usually used to achieve the performance required. For this reason, they are not particularly suitable for use in modern HMDs that are required to be compact, lightweight, and optimised for anthropometric data.

Traditional folded optical designs can be more compact, but can also introduce light loss mechanisms, reducing system efficiency. One of the simplest folded optical designs consists of an optical arrangement 200 as shown in FIG. 2.

The optical arrangement 200 comprises a beamsplitter 202 and a spherical combiner 204. In use, images are directed from a display source 206 or relay lens onto the beamsplitter 202. The beamsplitter 202 partially reflects the images onto the concave surface of the spherical combiner 204. The spherical combiner 204 reflects a collimated exit pupil through the beamsplitter 202 towards the user's eye 208.

However, if used in a HMD the optical arrangement 200 has to be adapted to enable the user to view the exterior environment 210. To do this, the beamsplitter 202 and spherical combiner 204 must be at least semi-transparent. As a result, some image source light is lost upon interaction with each element, as light is lost when only partial reflection occurs. Therefore the image presented to the eye is dimmer than desired. In addition, the light must pass twice through the beamsplitter 202, and this also increases the losses and can introduce ghost images.

A further disadvantage of optical arrangements 200 is that they are often not sufficiently lightweight and compact. The geometry of the beamsplitter 202 and spherical combiner 204 have to be matched to the exit pupil requirement, and so have to be sufficiently large to cater for the required anthropometric range thereby increasing the size of the optical geometry.

An improvement to the optical arrangement 200 is provided in expired patents U.S. Pat. Nos. 5,093,567 and 4,969,724. These patents show folded optical arrangements having multi-part folded eyepiece and relay lens assemblies.

An example of a known folded optical arrangement 300 found in these patents is shown in FIG. 3. The optical arrangement 300 has a compact eyepiece in an off-axis solid arrangement. The arrangement 300 comprises a wedge 302, prism 304, and cemented makeup piece 306. The prism 304 receives an image from a relay lens 308 or display source. The wedge 302 and prism 304 together form a collimated image for viewing by the user's eye 310. The makeup piece 306 optically manipulates light to counteract the effects of the prism 304 and wedge 302 so that the user can correctly view the exterior environment 312. The makeup piece 306 is typically bonded to the prism 304 through means of optical adhesive.

As can be seen in FIG. 3, the prism makes use of a transmission surface and a conventional curved combiner surface. Similarly, the wedge has two transmission surfaces. The make-up piece also has a surface matched to the combiner surface of the prism.

While the folded optical arrangement 300 solves some of the problems identified with the optical arrangement 200, new issues can be introduced. For example, the optical arrangement 300 of FIG. 3 contains off-axis components of simple surface form, for example spherical and cylindrical surfaces, which cause residual aberrations in the viewed image such as astigmatism and distortion.

Additionally the optical arrangement 300 of FIG. 3 is ideally suited for use with an image source of controlled numerical aperture (NA). In such arrangements, a relay lens with internal hard-stop is used to vignette unwanted light/rays to control the size of the resultant system exit pupil.

However, if such an optical arrangement is paired with a flat panel display, emissive display or direct image source with uncontrolled NA (excluding the use of a relay lens), the exit pupil size may not be controlled and unwanted light can propagate through the optical system resulting in a larger exit pupil which may not be fully corrected to remove aberrations. In FIG. 3 the unwanted light is shown by reference numeral 314. In this scenario, if the user's pupil is axially aligned to the centre of the exit pupil the display appears well corrected. Disadvantageously, movement of the eye or optical arrangement results in the user viewing areas of the exit pupil with mainly uncorrected light. In these areas, the image may appear blurry, distorted, or incorrect, and this is a clear disadvantage in a high performance conformal display.

Solutions could be implemented to block the uncorrected areas of the exit pupil, such as incorporating an external hard-stop 402 as shown in FIG. 4. However this has the disadvantage of impacting the user's general vision.

Accordingly, one object of the present invention is to overcome the problems of existing folded optical arrangements for use in HMDs.

SUMMARY

According to one aspect of the present invention there is provided a folded optical arrangement for use in a display, the display to transmit an image from an image plane to a user's eye, the arrangement providing a folded optical transmission path and comprising: a collimating element having a first optical element comprising a first plurality of optically powered surfaces; and a second optical element comprising at least one optically powered surfaces, the collimating element configured to receive light forming the image from an image source, and to collimate and output the light, wherein the first and second plurality of optically powered surfaces are arranged to define a plurality of interfaces along the folded optical path and wherein a refractive index change at each interface is predetermined to control the direction of light passing through the or each interface, and wherein one surface of the first optical element and one surface of the second optical element are adjacent to one another and each define an angle with a respective other surface of the relevant optical element at opposing ends of the adjacent surfaces and wherein the opposing angles are not equal.

Preferably, the arrangement further comprising a pupil expanding element having a waveguide, a coupling element configured to couple light output from the collimating element into the waveguide, and a decoupling element configured to decouple light from the waveguide for output to the user's eye.

Preferably, the decoupled light has a larger exit pupil than the coupled light.

Preferably, the angle defined on the second optical element is less than the angle defined on the first optical element.

Preferably, the arrangement further comprising a third optical element comprising at least one optically powered surface which is located between the image plane and the first optical element.

Preferably, the third optical element is a field lens.

Preferably, the first optical element comprising at least three optically powered surfaces.

Preferably, the first optical element is a three surface prism.

Preferably, the first optical element comprises a single-piece three-sided element having an elongate, substantially triangular cross-section.

Preferably, the second optical element comprising at least two optically powered surfaces.

Preferably, the second optical element is an optical wedge.

Preferably, the second optical element comprising an elongate element having a quadrilateral cross-section.

Preferably, adjacent surface of each optical element is separated by a gap.

Preferably, the gap is an air gap.

Preferably, the area over which the light is decoupled is larger than the area over which it is coupled.

Preferably, an incoupling region comprises a diffraction grating and an outcoupling region comprises a diffraction grating.

Preferably, the user is able to view an external environment through the pupil expanding element, in use.

Preferably, the waveguide and outcoupling region are substantially transparent.

Preferably, the first optical element comprises a substantially concave surface which is incident to incoming light in use.

Preferably, the substantially concave surface is optically coated to be substantially reflective.

Preferably, at least one of the optically powered surfaces on the first optical element is described by a multiple order polynomial.

Preferably, one of the angles is less than 30°.

Preferably, the first and second optical elements are of different materials.

Preferably, the coupling element comprises one of a diffraction grating, a hologram and a reflective element.

Preferably, the pupil expander comprises a plurality of waveguides.

Preferably, the pupil expander comprises a curved waveguide.

Preferably, the pupil expander is tilted relative to the collimating element.

Preferably, the arrangement further comprising an optically absorbing element behind the input region of the pupil expander to absorb any light not coupled into the pupil expander.

Preferably, a further combiner is used to reflect light from the pupil expander towards a user.

According to another embodiment of the present invention there is provided a display comprising a folded optical arrangement according other aspects of the invention.

Preferably, the display is in the form or at least one of a head mounted display, a head worn display and a heads up display.

BRIEF DESCRIPTION OF THE DRAWINGS

Embodiments of the invention will be described, by way of example, with reference to the following drawings, in which:

FIGS. 6A and 6B which show possible front views of an arrangement on the head of a user from above;

FIGS. 6C and 6D which show possible side views of the arrangement;

FIG. 9 is a simplified diagram for showing the angular orientations of the collimating element, according to an aspect of the present invention;

DETAILED DESCRIPTION

In general, the present invention relates to improvement in or relating to optical improvements for displays such as for example a head mounted display; a head worn display; or a heads up display (HMD, HWD, HUD respectively). In particular, the present invention relates to a folded optical arrangement for use in a display to transmit images from an image plane to a user's eye, and to a display incorporating the folded optical arrangement. Other aspects of the present invention relate to a display incorporating a waveguide.

An exemplary display such as for example a HMD or HWD according to the present invention comprises a folded optical arrangement, such as the optical arrangement of FIG. 5 (which will be described later), in order to overcome the problems of existing arrangements in the art.

Figure 5:
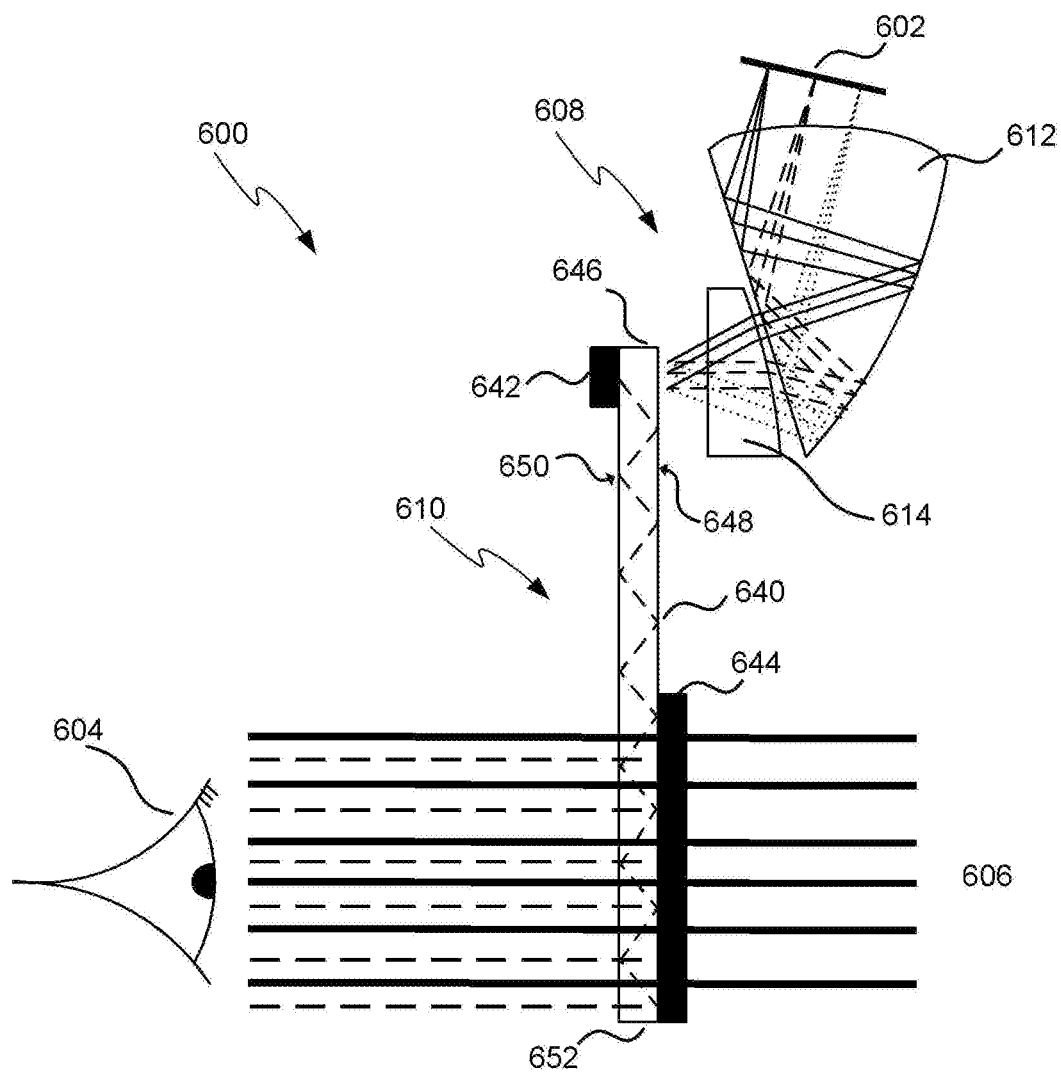
FIG. 5 is a cross-sectional diagram of a folded optical arrangement according to an embodiment of the invention.

FIG. 5 shows a cross-sectional of a folded optical arrangement 600 according to an embodiment of the invention. FIG. 5 shows the path of light rays through the optical arrangement 600 from an image plane 602 to a user's eye 604, and from the exterior environment 606 to the user's eye 604.

Figure 1:
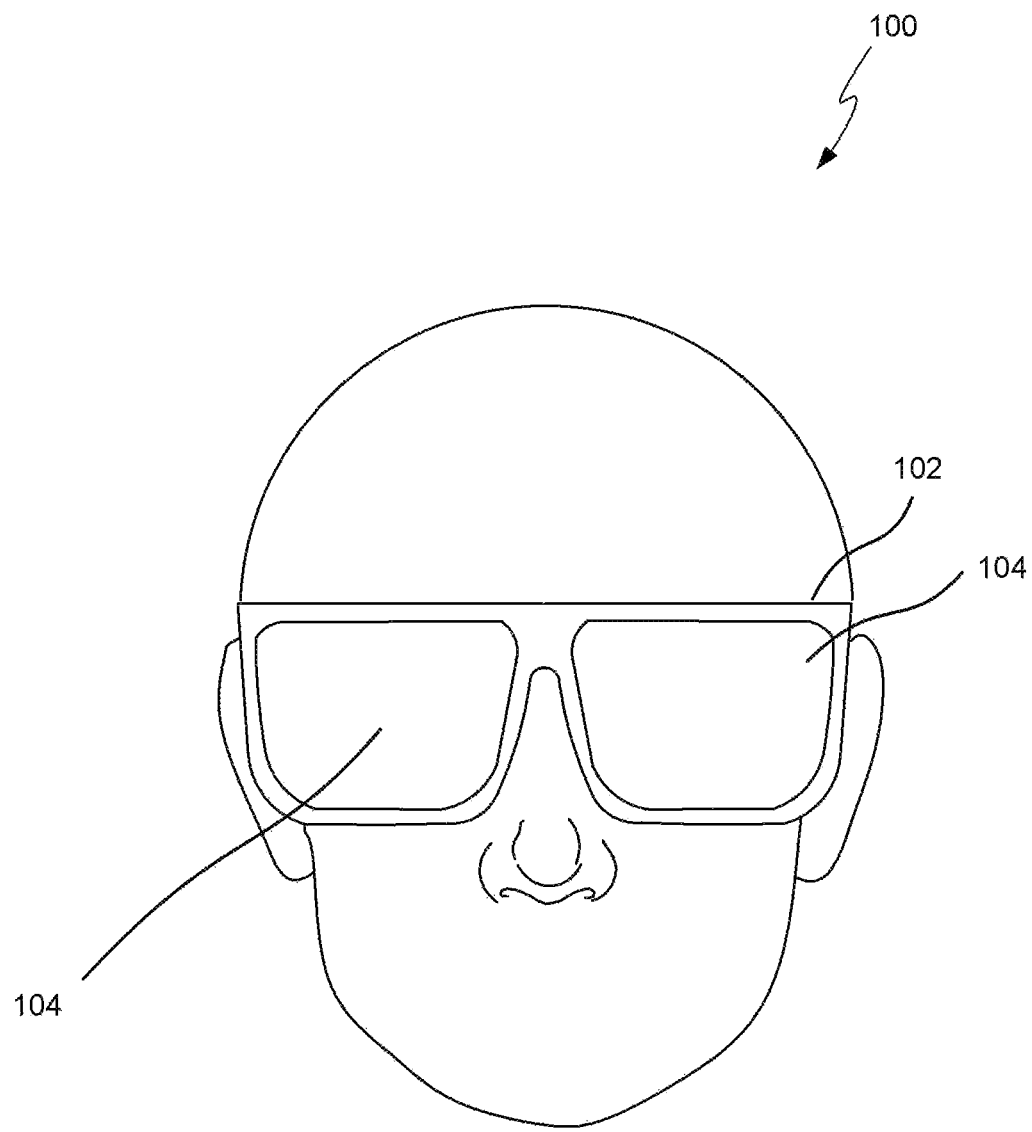
FIG. 1 is a representation of a head-mounted display.
Figure 2:
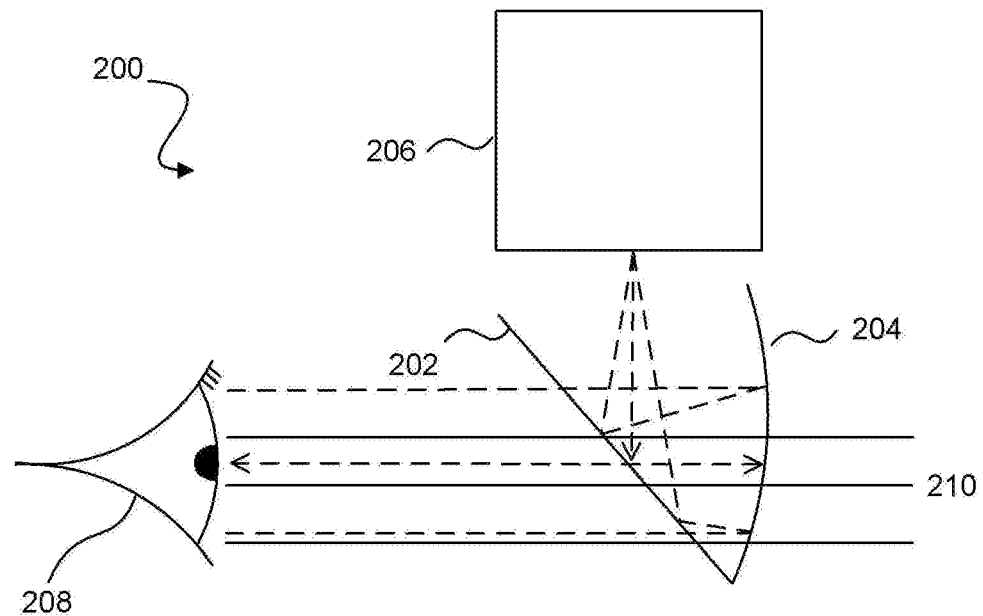
FIG. 2 is a cross-sectional diagram of a conventional optical arrangement.
Figure 3:
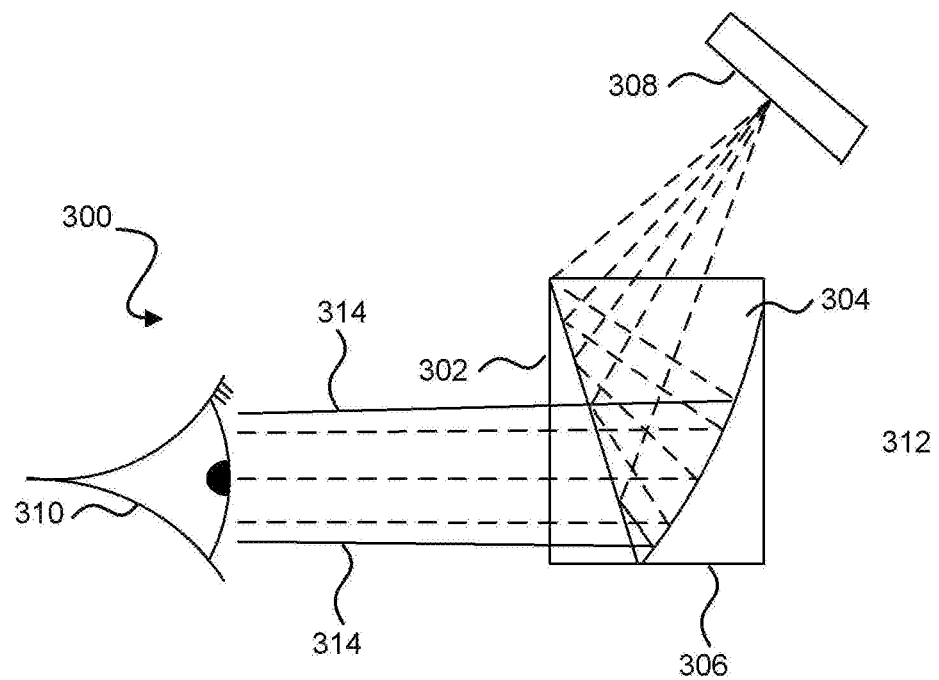
FIG. 3 is a cross-sectional diagram of a conventional off-axis solid optical arrangement.
Figure 4:
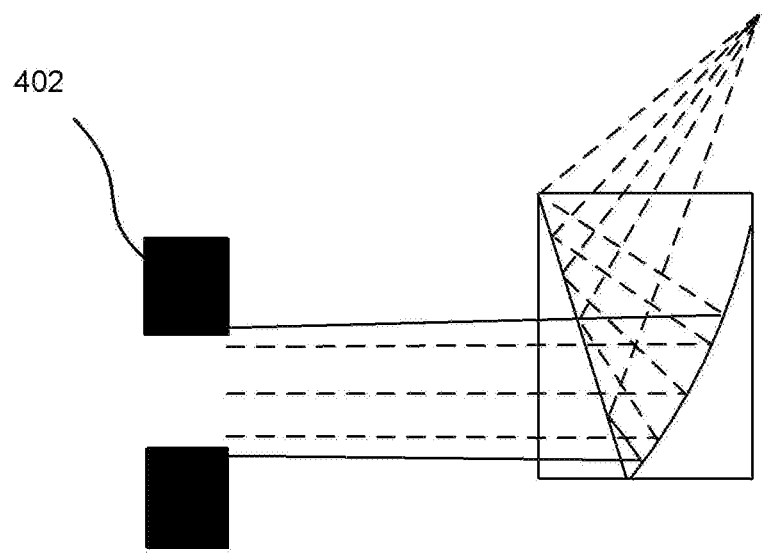
FIG. 4 is a cross-sectional diagram of a conventional off-axis solid optical arrangement incorporating an external hard stop.

The optical arrangement 600 comprises a collimating element 608, also described as collimating optics, and a pupil expanding element 610, also described as an exit pupil expander. Light forming an image from the image plane 602 is directed towards the collimating element 608. The collimating element 608 receives the light forming the image. The light is collimated by the collimating element 608 and the collimated light is output from the collimating element 608. The collimated light is incident on the input region of the pupil expanding element or waveguide optic 610 and the pupil expanding element 610 transmits the collimated light towards the location of the user's eye 604. The pupil expanding element 610 receives the light over a first input area and effectively expands the exit pupil output from the collimating element 608 so that light leaves the pupil expanding element 610 towards the eye in use over a larger, second output area. As a result, the collimating element 608 can be reduced in size to be highly compact, by generating a small exit pupil, whilst the system still maintains a large exit pupil, via the exit pupil expanding element, which is directed towards the user's eye 604 for displaying the image. An optically absorbing element (not shown) may be placed behind the input region of the pupil expander to absorb any light not coupled into the pupil expander. Furthermore, since the user is not required to look through the collimating element 608 (as they can look through the waveguide optic 610) there are fewer restrictions on the optical form, layout and makeup of those surfaces within the optical design, whereas the designs that require the user to look through the collimating element, such as with reference to the arrangement shown in FIGS. 3 and 4 would also have to be optimised to be see through whilst correcting the image light.

For the purposes of the figures, it will be assumed that the user's eye 604 is in the location shown, and references to the user's eye should be interpreted to mean that the typical use case is being described. However, it will be appreciated that the user's eye is not required for the invention to operate according to the principles set out herein. The optical arrangements described below ultimately generate exit pupils in the direction of an assumed position of the user's eye when the device is in use, regardless of where the user's eye actually is. Furthermore, the solid ray, dashed ray and dotted ray indicate the field of view of the optical arrangement. It should also be appreciated that the figures are illustrative, and do not show the exact ray paths through the optical arrangements.

Figure 6A:
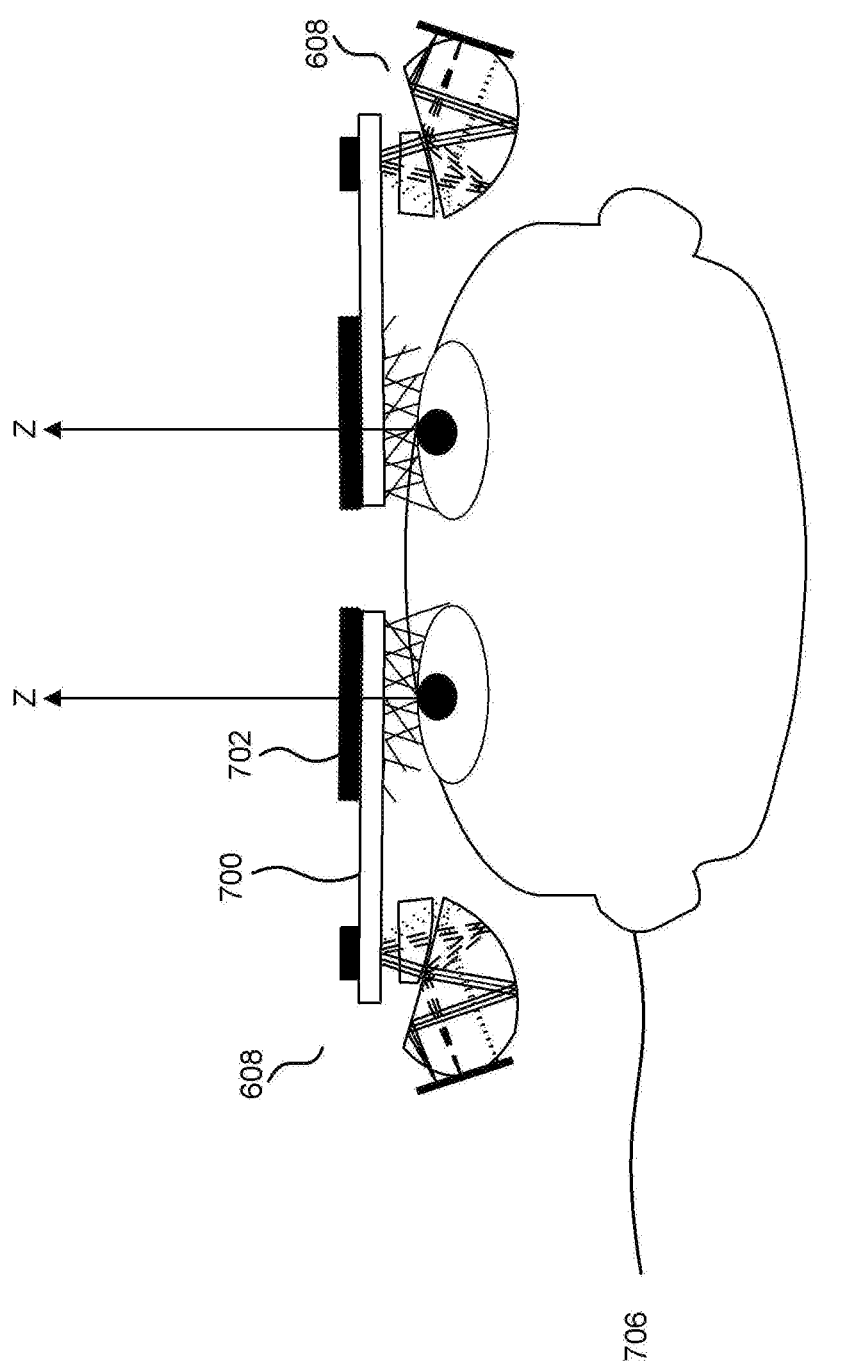
FIGS. 6A to 6D are representations of a number of different orientations of positioning of an optical arrangement of the present invention relative to a user and comprises.
Figure 6B:
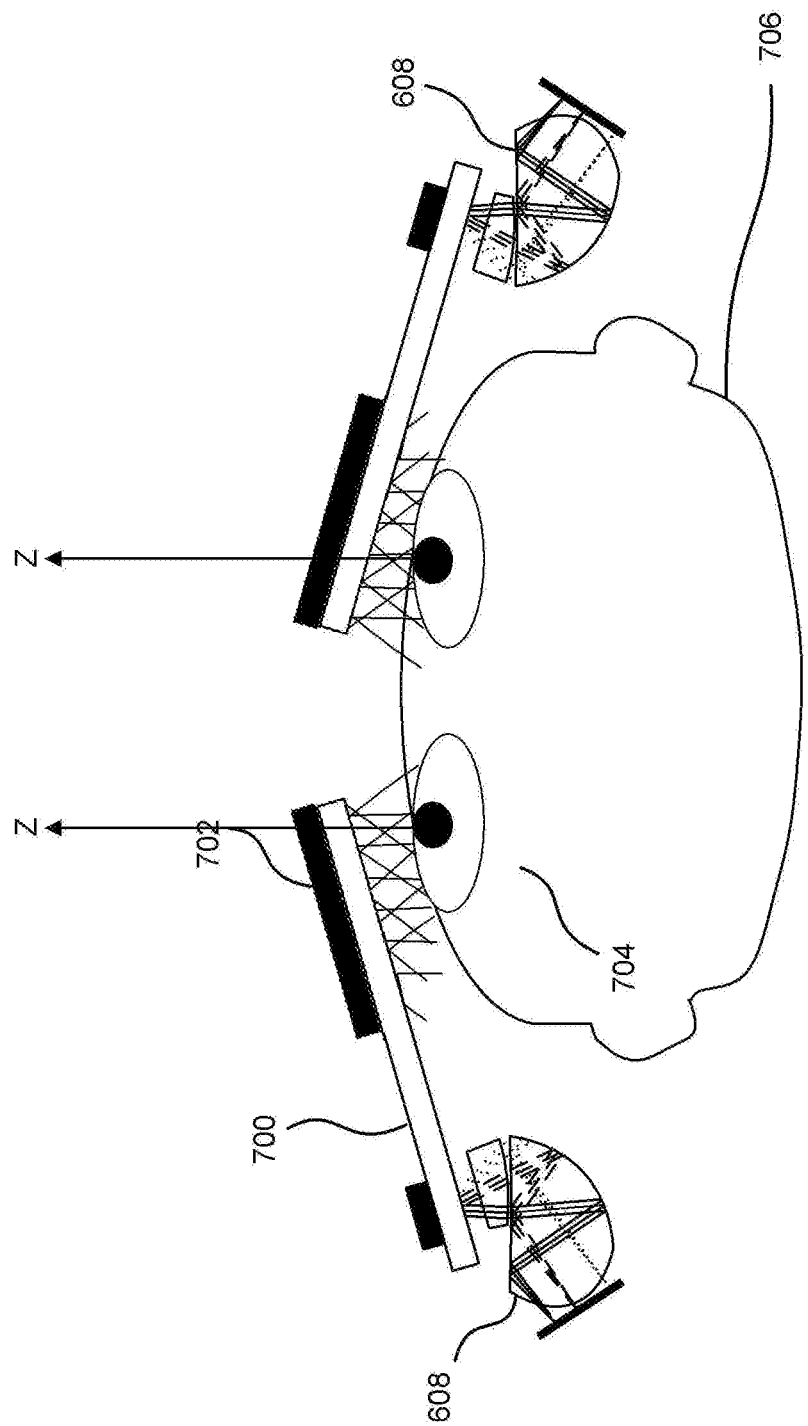
Figure 6C:
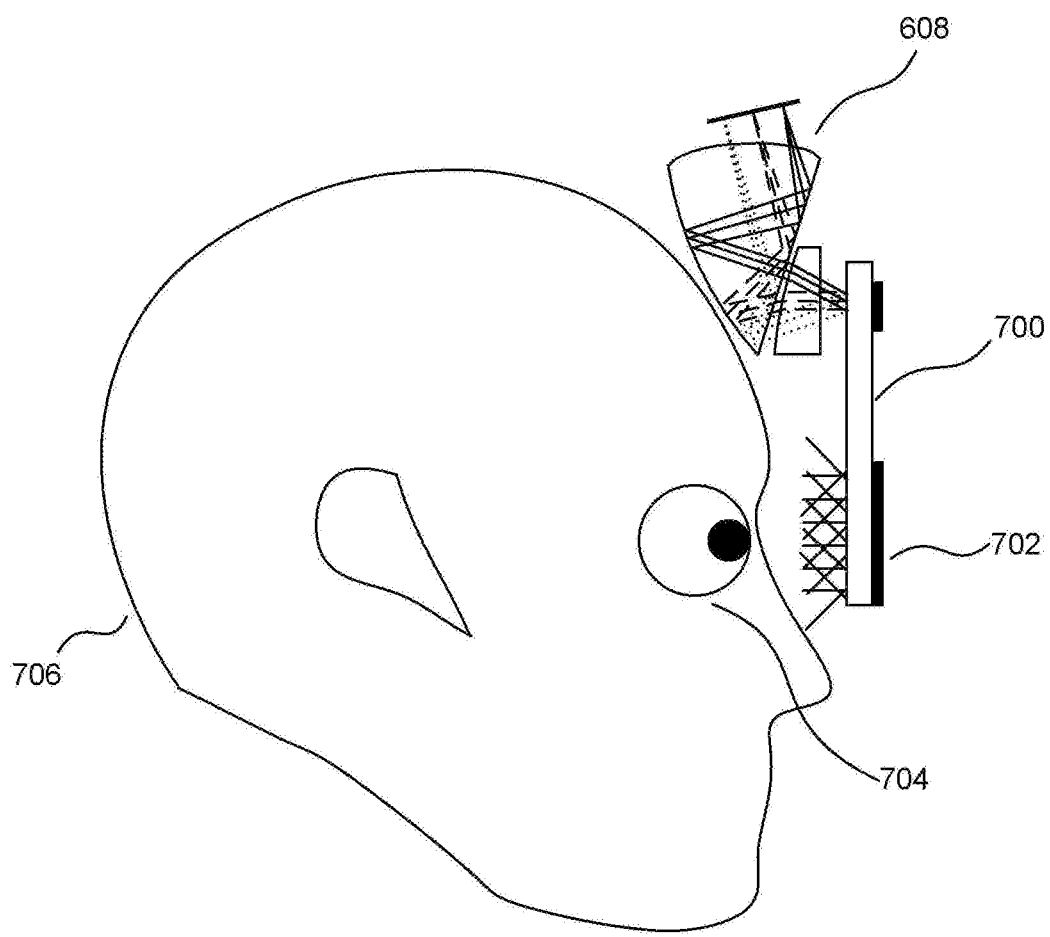
Figure 6D:
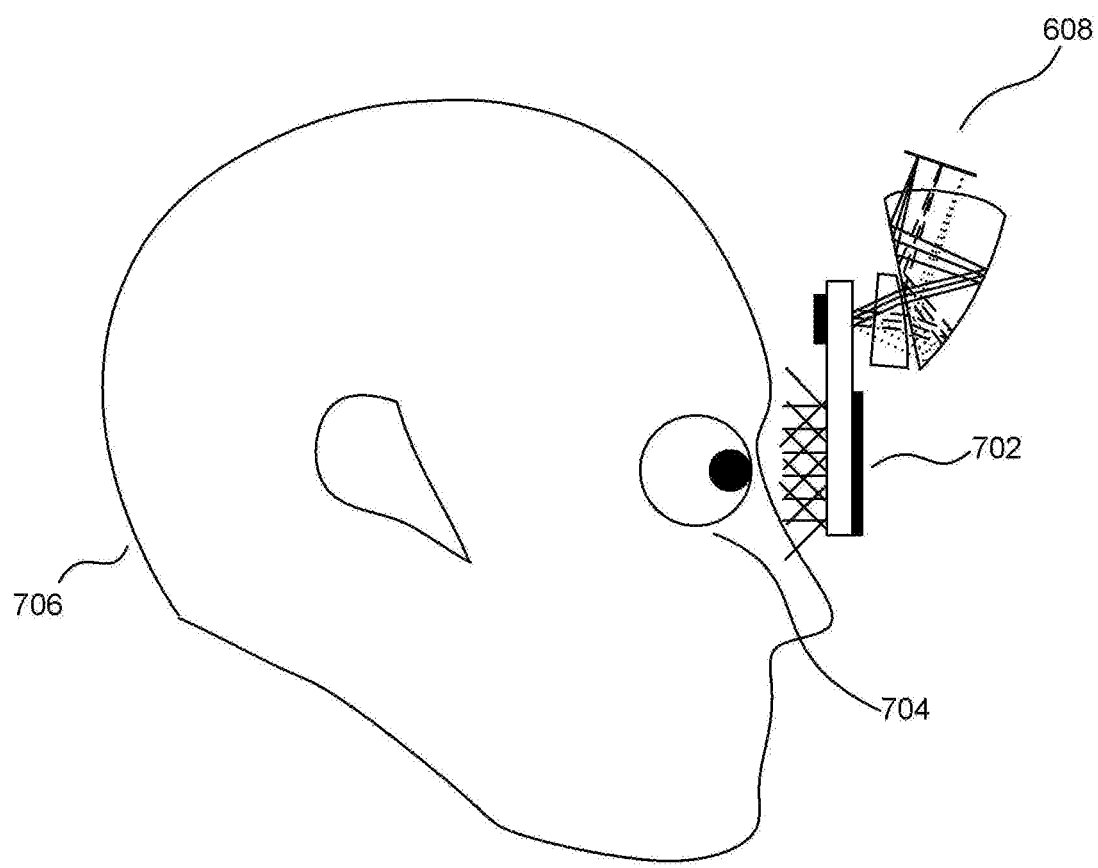

Referring to FIGS. 6A to 6D, the HMD is wearable by means of an appropriate support shown generally as 700, providing a look-through arrangement, such that the user may look through the display. The support may contain one or more optical elements 702 which can be viewed by one or both eyes 704 of the user. Optical elements 702 may comprise an outcoupling grating, incoupling grating and waveguide optics. Waveguide 640 is not shown in FIGS. 6A to 6D, and the support 700 is illustrative, it may take any shape or form. The HMD may further include a control system. The collimator element 608 of FIG. 5 may be located relative to the arc or shape of the head 706. In FIG. 6A the support is horizontal and in FIG. 6B the frame is tilted for aesthetic reasons and to accommodate a different head shape and is viewed from above the top of the head. The tilt may also accommodate the waveguide tilt. In figures, 6C and 6D two possible positions: behind and in front of the frame, are shown for the collimator element 608 and are viewed from the side. It will be appreciated there are many alternatives to the arrangements shown. The eye gaze direction is shown by the arrow Z in FIGS. 6A and 6B.

For use with or as the invention, the HMD can be of any appropriate type including googles, glasses, a helmet or helmet visor suitable for use in multiple fields. Ideally, the device is portable or adapted to be portable by means of the support. Although not shown in detail the support may include a support adapted to support the optical elements in front of the eye. The support may include: frames; side arms and supports for goggles and glasses; a helmet or visor; a headband; a neck or shoulder worn support; a gaming headset; or any other support that could be worn to hold the optical elements in the desired position.

The control system is variable depending on the use of the display. The control unit may be in situ or remote from the display. The control device may include a communications module for communicating with the optical elements and with other modules either on the display or remote therefrom. The communications may be wireless and/or wired. The control module may include different modules for carrying out different functions. These functions are not limited in any way but may include imaging, tracking, scene generation, processing, storage, power supply, audio etc.

The one or more optical elements 702 may comprise waveguide optics, input and/or output coupling gratings. Although not shown in detail, the optical elements are a substantially transparent display medium. The user is able to view the exterior environment through the optical elements, as well as any image relayed to the eye of the user in use via the HMD.

The support also incorporates at least one collimator element 608 that may include or be separate to the optical elements 702, for example on one of the arms of the support of an HMD. This is a good location due to the physical characteristics of the device. It will be appreciated that other locations and forms are equally applicable. In some embodiments, the support may incorporate two collimator elements as shown, one per optical element 702.

To display images to the user via the optical arrangement, the display may also incorporates an image source corresponding to the optical arrangement. The image source may have a controlled numerical aperture or an uncontrolled numerical aperture and may comprise a flat panel display, emissive display, a reflective display, a projection optic, a relay lens or any other type of display source, image or light generation unit.

Figure 7:
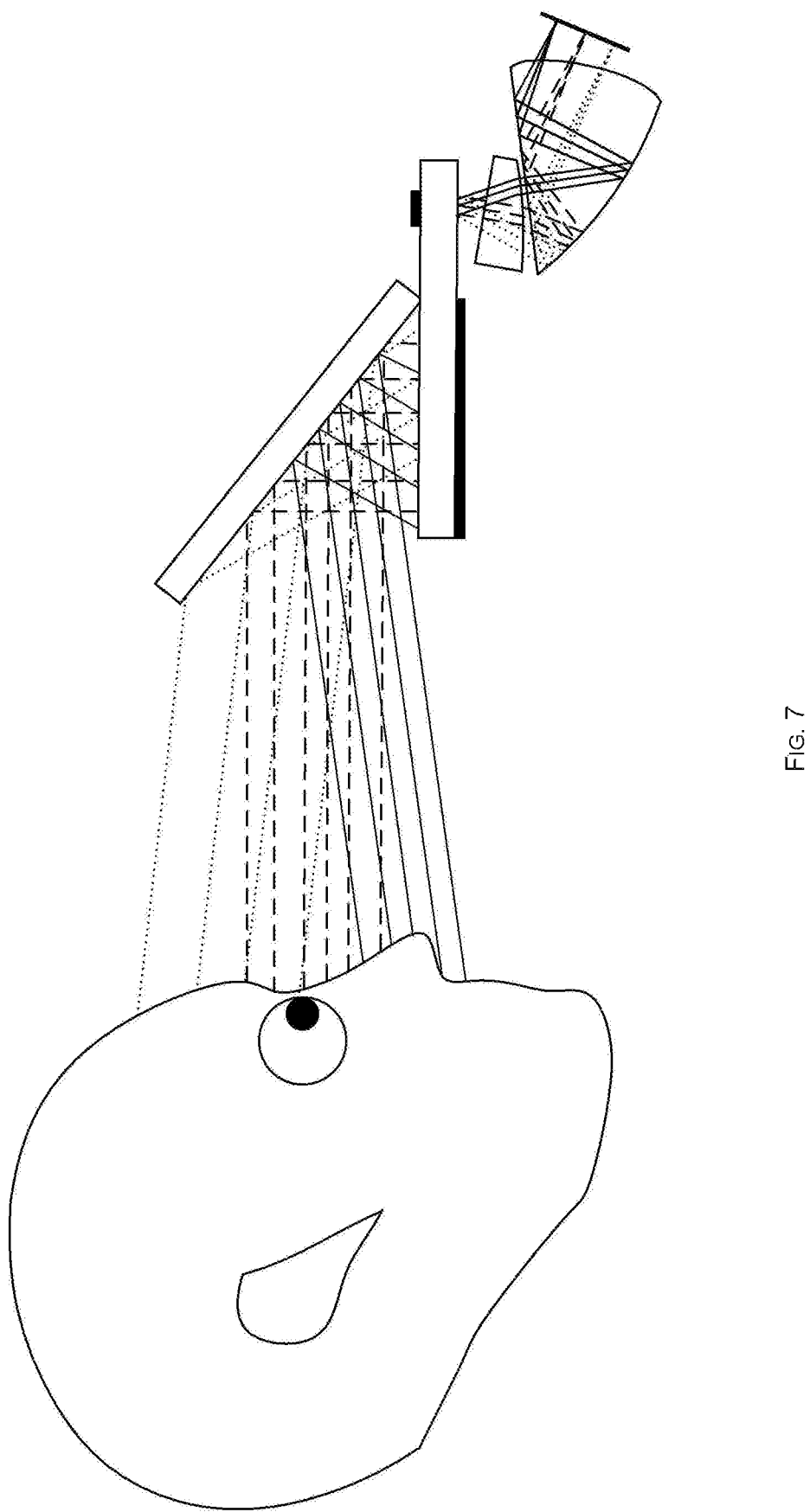
FIG. 7 shows a possible Heads Up Display (HUD) installation of the arrangement.

In an alternative, the user may use a heads up display as shown in FIG. 7.

Figure 8:
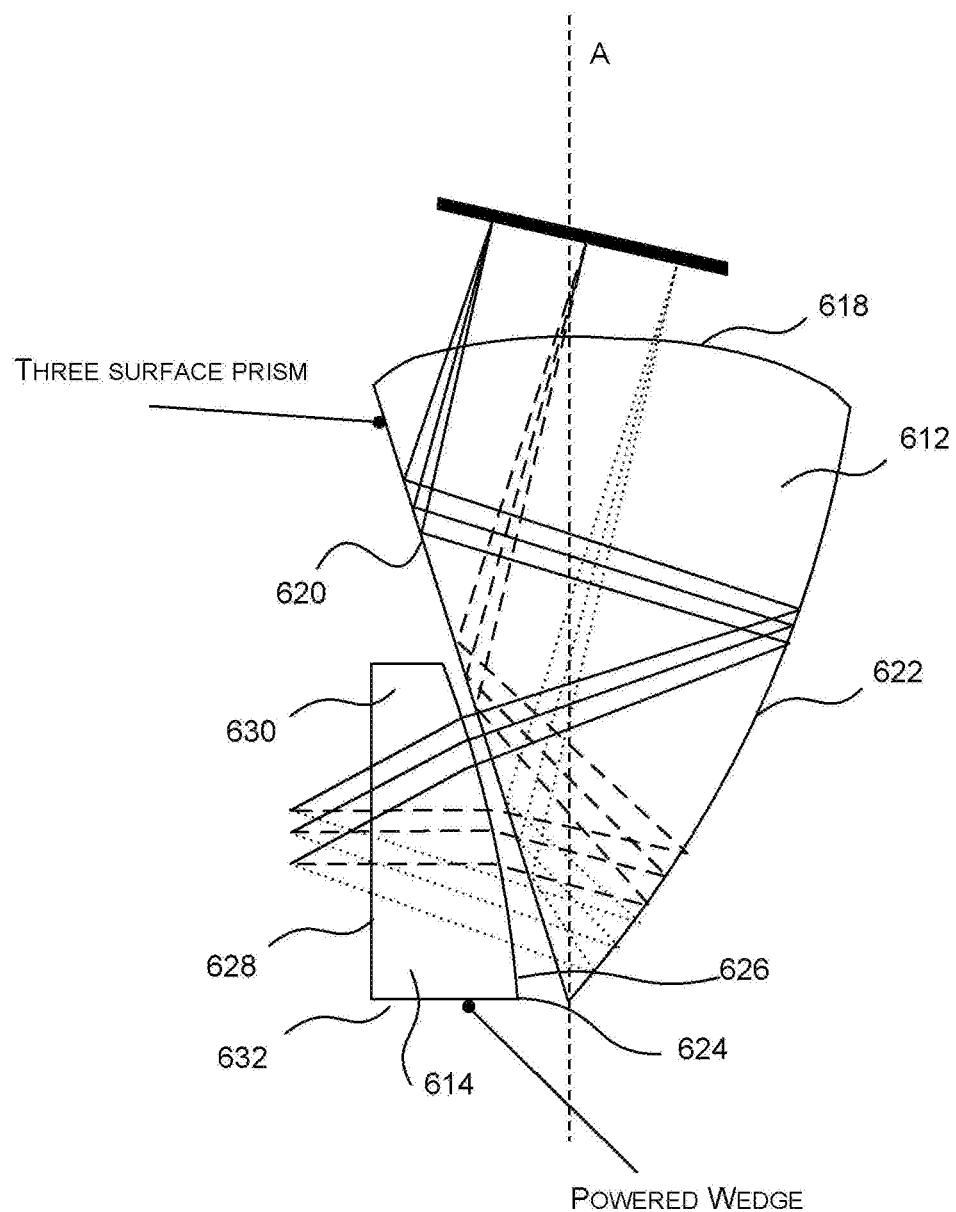
FIG. 8 is an enlarged cross-sectional diagram of the FIG. 5 collimating element according to an aspect of the invention.

An enlarged representation of the collimating element 608 of FIG. 5 is shown in FIG. 8. The collimating element 608 comprises a first optically powered optical element 612 (hereinafter referred to as a prism element) and a second optically powered element 614 (hereinafter referred to as a wedge element). The prism element 612 and wedge element 614 operate as an optical lens system, to collimate the light for output into the pupil expanding element 610. The prism element 612 and wedge element 614 may also be configured to optimise or counteract unwanted optical aberrations that are typically introduced by optical lens arrangements. For example, surface features of the prism element 612 and/or wedge element 614 may be configured to reduce aberrations and/or correct any other optical defects. The use of the two elements, whilst maintaining an air space between the elements allows the collimating element to operate as an air spaced optical doublet to improve chromatic correction. Furthermore a third optical element, not shown, may be added between the prism element 612 and image source to provide additional optical correction.

Prism element 612 comprises an input surface 626 that has optical power and is adjacent to a surface 620 of the wedge element 614. Surfaces 626 and 620 may have shapes that are substantially dissimilar. For example, surface 620 may be linear, and surface 626 may have a non-linear shape, such as a shape defined by a multi-order polynomial. Surfaces 620 and 626 may have a non-complementary or non-sympathetic shape. A non-complementary shape or non-sympathetic may refer to a shape such that when placing the shapes together, there is always a gap between the surfaces.

A non-complementary shape or dissimilar shape of the surface allows an additional optical surface form for correction of aberrations.

The shape of surfaces that may be a polynomial or extended polynomial shape as mentioned above may be modelled by determining parameters of the lens. One parameter that is used is a determination of the surface sag. The surface sag for the surfaces that use this surface form could (for example) be described by the following equation, which perturbs a conic aspheric surface by adding additional polynomial terms.

$$z = \frac{cr^2}{1 + \sqrt{1 - (1+k)c^2 r^2}} + \sum_{i=1}^{N} A_i E_i(x, y)$$

Where
c=base surface curvature
r=base surface radial distance
k=base surface conic constant
N=number of polynomial coefficients
$A_i$ is the coefficient on the $i^{th}$ polynomial term.

It will be appreciated that this is just one example of modelling the surfaces; other may equally well be used.

FIG. 9 shows a simple representation of the prism element 612 and the wedge element 614 to show example angular orientations. It should be noted that in FIG. 9 the surfaces of the elements are represented as having a linear shape for convenience, however the surfaces may have a curved shape as is described with reference to FIGS. 5 and 8. FIG. 9 shows a normal 900 relative to a wedge surface 628, from which the light exits the collimator. The normal is located at the centre of surface 628 and crosses surface 628 at point K. The normal extends to a point L where it intersects surface 626; to a point M where it intersects surface 620; and to a point N where it intersects surface 622. In addition, two angles are indicated 902 for the prism element and 904 for the wedge element at point J. Angle 902 is defined by surfaces 622 and 620 whilst angle 904 is defined by surfaces 628 and 626. The angle 904 can be determined based on the tangent of its angle. The tangent of angle 904 being:

Tan(angle 904)=KL/JK

Surfaces 620 and 626 are referred to herein as the adjacent surfaces of the respective wedge element and prism element as these are adjacent to one another in the normal orientation of the collimator elements. One of the angles (902, 904) is defined at one end of the adjacent surfaces and the other angle is defined at the other end of the adjacent surfaces. In other words, the angles are at opposing end of the adjacent surfaces. The interface between the adjacent surfaces is referred to herein as the adjacent interface.

The two angles can be varied to obtain an optimal orientation of the two elements which in turn give rise to optimal optical properties for the collimator. The angular difference between the two angles is predetermined and in general, the angles are not equal and angle 904 is less than angle 902. The specific angles are not essential but the angular difference is determined to ensure the correct path for the light coming from respective sources. By way of example angle 904 could be for example <30°.

In the present invention the prism element as referred to throughout is used for ease and is not intended to be a limitation as to the form and shape of the element 612. The prism element is thus intended to include any optical element comprising a plurality of optically powered surfaces. This could be a three surface prism or may have two or more surfaces. The preferred form is a three surface prism, but other shapes and forms are equally applicable. At least one of the optically powered surfaces on the first optical element may be described by a multiple order polynomial.

Similarly the wedge element is used of ease of reference but could be different shapes and forms. The wedge element is thus intended to include any optical element comprising one or more optically powered surfaces.

The combination of the prism element and the wedge element define a plurality of interfaces between the optical powered surfaces of each element. As light passes through the combination (also referred to as the collimating element) and as a result of the interfaces there is a change in refractive index, which when combined with the surface shape, leads to a change in direction of the light passing through the interface. This enables light beams to be directed by the combination. Due to the relative positioning of the prism and wedge there are different interfaces and different shapes of interface this helps define a "folded path" through the collimator.

The prism and wedge elements may be in direct contact or have a gap between their surfaces. The gap can be an air gap or may comprise other material such as glue etc. The addition of the air gaps adds a further interface (for example, from the prism to air; from air to the wedge and so on). The further interfaces have effect of further directing the light. The overall light direction will be described in greater detail below. The result of the combination is that due to the multiple interfaces light can be guided in a very controlled manner and in a component that is compact and light as is the optimum for head mounted optics. The juxtaposition of the first and second optically powered elements (with or without a gap) define a compact folder path through which light can be directed.

The collimating element 608 produces a collimated exit pupil that is well corrected whilst maintaining a low volume and size. As used herein, 'well-corrected' is intended to mean that defects of the light, such as aberrations, artefacts, chromatic distortion, are minimised in order to provide a predefined standard of optical performance which may be different for different applications.

The prism 612, a 3D representation of which is also shown in FIG. 5 or 8, is a single-piece three-sided element having by way of example an elongate, substantially triangular cross-section. The prism 612 therefore has two three-edged bases (only one of which is shown in FIG. 9) 616 and three surfaces 618, 620, 622 joining corresponding edges of the two bases 616. Any number of the surfaces 618, 620, 622 of the prism 612 are optically powered and the surface powers may be different from one surface to the next. In the embodiment of FIG. 8, the prism element 612 and wedge element are separated by a gap 624 such as for example an air gap. The gap 624, wedge 614 and prism 612 may be of any combination of materials and as each may be different the interfaces between the three can provide a difference in refractive index from one element to the next. This can be exploited in the present invention to control the direction of light passing through the combination of elements. The gap may be formed from any type of spacing material having a different refractive index than the other elements. In the FIG. 8 example, the prism 612 is surrounded by air, which has a lower refractive index than the other elements. Many other different combinations of material can be used.

The operation of the prism element 612 alone and in combination with the wedge element 614 and the gap 624 will now be described. Light from the image plane 602 enters the prism element 612 at a first, receiving surface 618. The receiving surface 618 is optically powered, and may be described by a spherical, aspherical, cylindrical, toroidal or multiple order polynomial surface shape.

The light travels through the prism element 612 and undergoes Total Internal reflection (TIR) at a second surface 620. The TIR occurs because the surrounding material, air, has a lower refractive index than the material of the prism 612 and because the angle of incidence of the light is greater than the critical angle for the interface at the surface 620 between the prism element 612 and the air. The surface 620 is also optically powered and may be described by a spherical, aspherical, cylindrical, toroidal or multiple order polynomial surface shape. It should be noted that partial internal reflections or a reflection due to a reflective coating may be used instead of TIR, however these may be less efficient.

The surface 620 is tilted relative to a central axis A of the prism 612. Tilting the surface 620 relative to the normal axis can help to reduce TIR breakdown that would occur if the transmission surface were aligned closer to the normal axis. Tilting the surface 620 in this way beneficially enables the image plane to be oriented at a shallower angle relative to the normal axis, permitting a more compact arrangement.

By virtue of having undergone TIR at the surface 620, the light is reflected towards the reflective surface 622. The reflective surface 622 is also optically powered and may be described by a spherical, aspherical, cylindrical, toroidal or multiple order polynomial surface shape. The reflective surface 622 is optically coated to reflect light. Light reflected within the prism 612 towards the reflective surface 622 therefore experiences the reflective surface 622 as a second surface mirror. The reflective surface 622 may be untilted or minimally tilted relative to the normal axis A to reduce off axis aberration. The light reflected by the coating applied to the reflective surface 622 returns toward the surface 620.

The light reflects from the reflective surface 622 and is re-incident on the surface 620 at an angle that is less than the critical angle for the interface at the surface 620 between the prism element 612 and the air, so the light is transmitted through the surface 620 and exits the prism element 612. The light exits the prism element 612 and travels into the gap 624 between the prism element 612 and the wedge element 614.

The light travels through the gap 624 and enters the wedge element 614. The refractive index of the air in the gap 624 is lower than the refractive index of the material of the wedge element 614. The wedge element 614 is for example, an elongate element having quadrilateral cross-section, and so has two surfaces 626, 628 connected by upper and lower ends 630, 632.

The surfaces 626, 628 and ends 630, 632 extend between bases (not shown in FIG. 5). The wedge element 614 may also take a substantially triangular cross section, without an upper end 630.

The wedge element 614 receives light from the gap 624 at the first, input surface 626. The light leaves the wedge 614 at the second, output surface 628.

In the embodiment of FIG. 5 or 8, the input surface 626 of the wedge 614 may also be described by a spherical, aspherical, cylindrical, toroidal or multiple order polynomial surface shape. The light is transmitted through the wedge 614 from the input surface 626 to the output surface 628.

The output surface 628 is typically planar but may also be described by a spherical, aspherical, cylindrical, toroidal or multiple order polynomial surface shape. At the output surface 628, the light exits the wedge element 614 because the light is incident on the output surface 628 at an angle that is less than the critical angle for the surface. The light that exits the wedge element 614 is now collimated and forms a well corrected exit pupil.

In the embodiment of FIG. 5 or 8, the prism element 612, gap 624, and wedge element 614 provide a number of degrees of freedom that are used to manipulate the light in order to result in collimated, well-corrected exit pupil. The collimated light exits the collimating element 608 at the wedge element 614. In some embodiments, further components may be incorporated to increase the number of degrees of freedom of the arrangement and collimated light may enter or exit the collimating element 608 via a different component. For example, a third optical element, a field lens, may be incorporated into the collimating element 608 to further reduce residual aberrations such as distortion and/or field curvature. In some embodiments, a further corrective element may be incorporated in the collimating element 608 to chromatically correct the light.

Moreover, in the embodiment of FIG. 5 or 8, any of the three surfaces 618, 620, 622 of the prism element 612 and either of the two surfaces 626, 628 of the wedge 614 may have varied optical power and surface forms. In some embodiments, the optical properties of the surface 620 of the prism element 612 and the input surface 626 of the wedge element 614 may be matched or designed to be complementary for specific applications.

The materials of the prism element 612 and wedge element 614 may be the same or may be different to take advantage of the optical characteristics such as refractive indices that different materials have. Similarly, the surrounding material and/or spacing material of the gap 624 are variable to optimise the optical characteristics of the collimating element 608. Materials for the optical elements can be of any appropriate nature. For example, the materials may comprise one or more of optical glasses, polymers and plastics of varying refractive index and abbe number may be used, such as: N-BK7 (low index glass), N-SF6 (high index glass), 7980_0F (low index fused silica), PMMA (low index polymer) and E48R (low index polymer). It may be advantageous to have both optical elements made from different materials so as to combine materials with different indices and different dispersion characteristics. For example, the optical wedge may be manufactured from a material with low dispersion to mitigate chromatic splitting of light during the interaction with the optically powered surface.

Returning to FIG. 5, collimated light from the collimating element 608 enters the pupil expanding element 610. The pupil expanding element 610 comprises a waveguide 640, an incoupling region 642, and an outcoupling region 644. The pupil expanding element 610 is arranged so that the collimated light is incident on the waveguide 640. A first end 646 of the waveguide 640 is aligned with the wedge element 614 so that the collimated light is incident upon a first surface 648 of the waveguide 640, in use.

The waveguide 640 is a planar slab waveguide. The waveguide 640 comprises an optically transmissive substrate. The waveguide 640 is arranged adjacent to the collimating element 608. The light exiting the collimating element 608 passes into the waveguide 640 via the first surface 648. In some embodiments, the waveguide may also be curved in one or two dimensions.

The in coupling region 642 in FIG. 5 may comprise a mirror, a diffraction grating, a hologram or other suitable optical coupling device. The incoupling region 642 abuts the second surface 650 of the waveguide 640 at the first end 646 of the waveguide 640. The incoupling region 642 couples the light into the waveguide 640 under TIR, the light is then able to travel along the waveguide 640 from the first end 646 to a second end 652 of the waveguide 640.

The incoupling region 642 is dimensioned to couple light that is incident on the waveguide 640 into the waveguide 640 over a coupling area or aperture. The dimensions, typically the height and width, of the incoupling region 642 dictate the size of the coupling area. Light from the collimating element 608 incident on both the waveguide 640 and the incoupling region 642 is coupled into the waveguide 640. Light from the collimating element 608 incident on the waveguide 640 but not on the incoupling region 642 is not coupled to the waveguide 640 and passes through the waveguide 640.

The dimensions of the incoupling region 642 are chosen to correspond to a portion of the exit pupil output from the collimating element 608 where the light is well corrected. Therefore, if a well corrected image is output from the collimating element 608, the incoupling region 642 can be matched dimensionally to the dimensions of the well corrected exit pupil and remove any surrounding area of exit pupil that is not well corrected by permitting them to pass directly through the waveguide 640 and remain uncoupled to the waveguide 640.

Light is coupled to the waveguide 640 by the incoupling region 642 by causing it to reflect or diffract towards the second end 652 of the waveguide 640. The angle at which the light is reflected or diffracted within the waveguide 640 by the incoupling region 642 is greater than critical angle for the interface of the waveguide 640 with the external environment 606, i.e. the surrounding air. Therefore, the coupled light undergoes total internal reflection at each interface along the waveguide 640 until it reaches the outcoupling region 644.

The outcoupling region 644 of FIG. 5 may comprise a mirror array, a diffraction grating, a hologram or other suitable optical decoupling device. In FIG. 5, the outcoupling region 644 abuts the first surface 648 of the waveguide 640 and the user's eye is spaced from the second surface 650 of the waveguide 640. In other embodiments, the outcoupling region 644 may abut the second surface, and the user may view the waveguide's first surface. The outcoupling region 644 is positioned at the second end of the waveguide.

The outcoupling region 644 effectively performs the opposite function to the incoupling region 642 and decouples the light travelling along the waveguide 640 from the waveguide 640.

The decoupling is achieved by reflection or diffraction, dependent upon the type of decoupling element used. The light is therefore transmitted out of the waveguide 640 at the outcoupling region 644.

The outcoupling region 644 is dimensioned to decouple light from the waveguide 640 over a decoupling area or aperture. In other words, the exit pupil of the light exiting the waveguide 640 has a particular area or aperture because the outcoupling region 644 decouples light over that area of the waveguide. The dimensions of the exit pupil generated out of the waveguide are dictated by the dimensions of the outcoupling region 644. To achieve an expanded exit pupil, the dimensions of the outcoupling region are greater than those of the incoupling region. Accordingly, the input and output regions of FIG. 5 are dimensioned so that the input region is smaller than the output region.

Once the light has been decoupled from the waveguide 640 and exits the waveguide 640, it is directed to the user's eye. The decoupled light remains collimated and exits over a larger area than the area of the exit pupil of the collimated light exiting the collimating element 608 and of the collimated light entering the waveguide 640 that is coupled to the waveguide 640.

In use, the user's eye is positioned to view the second surface 650 of the waveguide 640. The user's eye is also aligned with the outcoupling region 644. The outcoupling region 644 and waveguide 640 permit light from the external environment to pass through them towards the user's eye so that the user can view the external environment. The outcoupling region 644 and waveguide are transparent or translucent to permit the user to view the external environment.

By viewing the outside world through the waveguide 640 the user does not have to look through a thick and powered optical element. This can help to mitigate issues encountered with the external view from the outside world being distorted after the light from the outside world has been transmitted through a thick, powered optical element, which can induce refractive errors.

In some embodiments, the incoupling region and/or outcoupling region may be fully or partially optically coated, optionally using a dielectric, to vary the optical qualities of each. If the outcoupling region is fully coated so as not to transmit light from an external environment, the user will be able to see the image alone when viewing the waveguide.

The folded optical arrangement 600 described above is particularly beneficial for use in head-mounted displays. The use of a thin waveguide optic removes the requirement for a user to view the generated image and outside world through a thick or powered optical element. For the user to view the external environment, light from the external environment needs to only travel through the outcoupling region and the waveguide to reach the user's eye. In addition, the collimating element 608 can be specifically designed to improve the quality of the image displayed to the user because the user does not have to view the external environment through the collimating element 608. Furthermore, the expansion of the exit pupil performed by the pupil expanding element 610 permits a smaller, more compact collimating element 608 with improved exit pupil performance, thereby reducing the volume occupied by the arrangement and the mass of the arrangement. It is envisaged that a significant volume reduction can be achieved as compared to a conventional eyepiece optic. Furthermore, the use of a waveguide permits the folding of the optical system to move the bulk of the optical elements away from the user's eye.

Figure 10A:
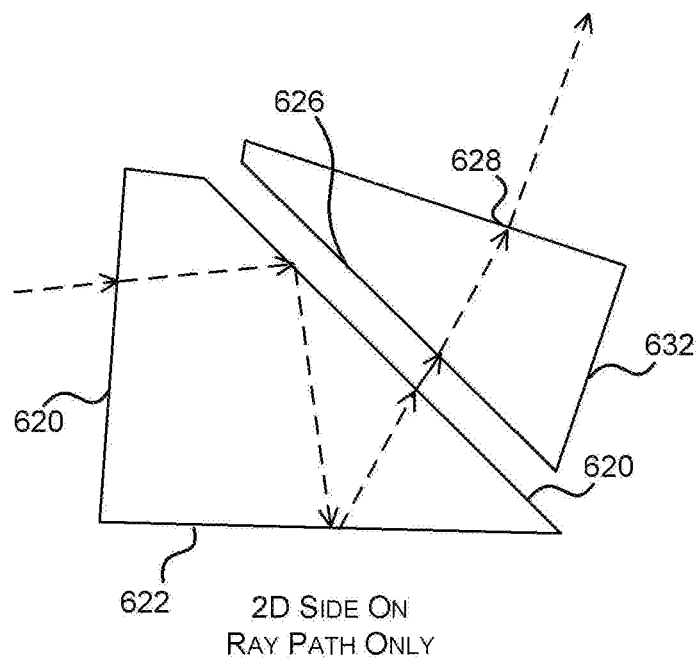
FIGS. 10A and 10B are respective 2D and 3D representations of the folded optical arrangement.
Figure 10B:
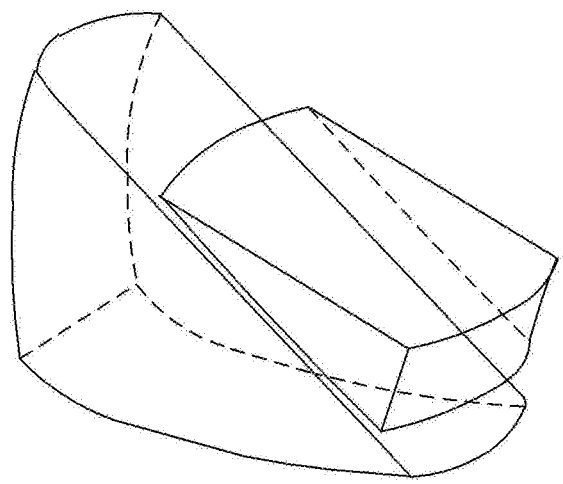

FIGS. 10A and 110B show respectively a 2D and a 3D representation of the prism and the wedge combination. FIG. 10A shows a 2D representation side on with an exemplary ray path shown and 10B shows a 3D view of the combination of the prism and wedge with optically powered surfaces shown.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A folded optical arrangement for use in a display, the display to transmit an image from an image plane to a user's eye, the arrangement providing a folded optical transmission path and comprising:
    a collimating element having a first optical element and a second optical element, the first optical element comprising a first plurality of optically powered surfaces, and the second optical element comprising at least one optically powered surface, the collimating element configured to receive light forming the image from an image source, and to collimate and output the light,
    wherein the first optical element comprising the first optically powered surface is arranged to receive the light forming the image, and the second optically powered surface is reflective and arranged to receive light from the first optically powered surface,
    wherein the first plurality of optically powered surfaces and the at least one optically powered surface are arranged to define a plurality of interfaces along the folded optical path and wherein a refractive index change at each interface is predetermined to control a direction of light passing through each interface, and
    wherein one surface of the first optical element and one surface of the second optical element are adjacent to one another and the adjacent surfaces have a different shape and each define an angle with another surface of the respective optical element at an opposing end of the adjacent surfaces so as to provide opposing angles, and wherein the opposing angles are not equal.

2. The folded optical arrangement of claim 1, further comprising a pupil expanding element having a waveguide, a coupling element configured to couple light output from the collimating element into the waveguide, and a decoupling element configured to decouple light from the waveguide for output to the user's eye.

3. The folded optical arrangement of claim 2, wherein the decoupled light has a larger exit pupil than the coupled light.

4. The folded optical arrangement of claim 1, wherein the angle defined on the second optical element is less than the angle defined on the first optical element.

5. The folded optical arrangement of claim 1, further comprising a third optical element comprising at least one optically powered surface which is located between the image plane and the first optical element.

6. The folded optical arrangement of claim 1, wherein the first optical element comprises at least three optically powered surfaces.

7. The folded optical arrangement of claim 1, wherein the first optical element is a single-piece three-sided element having an elongate, substantially triangular cross-section.

8. The folded optical arrangement of claim 1, wherein the second optical element comprises at least two optically powered surfaces.

9. The folded optical arrangement of claim 1, wherein the second optical element is an optical wedge.

10. The folded optical arrangement of claim 1, wherein a surface of the first optical element is adjacent a surface of the second optical element, and the adjacent surfaces are separated by a gap.

11. The folded optical arrangement of claim 2, wherein the area over which the light is decoupled is larger than the area over which it is coupled.

12. The folded optical arrangement of claim 2, wherein an incoupling region comprises a diffraction grating and an outcoupling region comprises a diffraction grating.

13. The folded optical arrangement of claim 1, wherein at least one of the optically powered surfaces on the first optical element is described by a multiple order polynomial.

14. A display comprising a folded optical arrangement according to claim 1.

15. The display of claim 14 in the form of at least one type of display selected from display types including a head mounted display, a head worn display, and a head up display.

16. A folded optical arrangement for use in a display, the display to transmit an image from an image plane to a user's eye, the arrangement providing a folded optical transmission path and comprising:
    a collimating element having a first optical element and a second optical element, the first optical element comprising a first plurality of surfaces including two or more optically powered surfaces, and the second optical element comprising a second plurality of surfaces including at least one optically powered surface, the collimating element configured to receive light forming the image from an image source, and to collimate and output the light,
    wherein the first optical element comprising the first optically powered surface is arranged to receive the light forming the image, and the second optically powered surface is reflective and arranged to receive light from the first optically powered surface, and
    a pupil expanding element having a waveguide, a coupling element configured to couple light output from the collimating element into the waveguide, and a decoupling element configured to decouple light from the waveguide for output to the user's eye, the decoupled light having a larger exit pupil than the coupled light;
    wherein the optically powered surfaces of the first and second optical elements are arranged to define a plurality of interfaces along the folded optical path and wherein a refractive index change at each interface is predetermined to control the direction of light passing through the or each interface, and wherein one surface of the first optical element and one surface of the second optical element are adjacent to one another and the adjacent surfaces have a different shape and each define an angle with another surface of the respective optical element at an opposing end of the adjacent surfaces so as to provide first and second angles, and wherein the first and second angles are not equal.

17. The folded optical arrangement of claim 16, wherein the second angle defined on the second optical element is less than the first angle defined on the first optical element.

18. A display comprising the folded optical arrangement of claim 16, the display being in the form of at least one type of display selected from displays including a head mounted display, a head worn display, a head up display, googles, glasses, a helmet, a helmet visor, and a gaming headset.

19. A folded optical arrangement for use in a display, the display to transmit an image from an image plane to a user's eye, the folded optical arrangement providing a folded optical transmission path and comprising:

a collimating element having a first optical element and a second optical element, the first optical element comprising a first plurality of surfaces including three or more optically powered surfaces, and the second optical element comprising a second plurality of surfaces including at least two optically powered surfaces, the collimating element configured to receive light forming the image from an image source, and to collimate and output the light; and a third optical element comprising at least one optically powered surface which is located between the image plane and the first optical element;

wherein the first optical element comprising a first optically powered surface is arranged to receive the light forming the image, a second optically powered surface which is reflective, and arranged to receive light from the first optically powered surface, and a third optically powered surface which is configured to receive light reflected by the second optically powered surface and reflect it back towards the second optically powered surface, wherein the optically powered surfaces of at least the first and second optical elements are arranged to define a plurality of interfaces along the folded optical path and wherein a refractive index change at each interface is predetermined to control the direction of light passing through the or each interface, and wherein one surface of the first optical element and one surface of the second optical element are adjacent to one another and the adjacent surfaces have a different shape and each define an angle with another surface of the respective optical element at an opposing end of the adjacent surfaces so as to provide first and second angles, and wherein the second angle defined on the second optical element is less than the first angle defined on the first optical element.

20. A display comprising the folded optical arrangement of claim 19, the display being in the form of at least one type of display selected from display types including a head mounted display, a head worn display, a head up display, googles, glasses, a helmet, a helmet visor, and a gaming headset.

* * * * *